(12) United States Patent
Kitchener

(10) Patent No.: US 6,843,836 B2
(45) Date of Patent: Jan. 18, 2005

(54) INTEGRATED COMPRESSOR DRIER APPARATUS

(75) Inventor: Anthony John Kitchener, Richmond (AU)

(73) Assignee: Cash Engineering Research Pty Ltd., Richmond (AU)

( * ) Notice: Subject to any disclaimer, the term of this patent is extended or adjusted under 35 U.S.C. 154(b) by 9 days.

(21) Appl. No.: 10/257,463

(22) PCT Filed: Apr. 10, 2001

(86) PCT No.: PCT/AU01/00403

§ 371 (c)(1),
(2), (4) Date: Oct. 11, 2002

(87) PCT Pub. No.: WO01/77528

PCT Pub. Date: Oct. 18, 2001

(65) Prior Publication Data

US 2003/0037679 A1 Feb. 27, 2003

(30) Foreign Application Priority Data

Apr. 11, 2000 (AU) .............................................. PQ6829
Sep. 8, 2000 (AU) .............................................. PQ9997

(51) Int. Cl.⁷ .............................................. B01D 47/00
(52) U.S. Cl. ..................... 96/234; 55/DIG. 17; 96/242; 96/270; 96/295
(58) Field of Search ..................... 55/DIG. 17; 95/231, 95/149, 187, 214, 215, 220, 227, 228, 229, 159, 170; 96/234, 242, 270, 271, 243, 266, 295, 322

(56) References Cited

U.S. PATENT DOCUMENTS

| | | | | |
|---|---|---|---|---|
| 2,494,644 A | * | 1/1950 | Clement | 95/122 |
| 2,955,673 A | * | 10/1960 | Kennedy et al. | 96/113 |
| 3,226,948 A | * | 1/1966 | Alderson et al. | 62/317 |
| 4,055,403 A | | 10/1977 | Strauss | |
| 4,375,977 A | | 3/1983 | Honerkamp et al. | |
| 4,406,589 A | * | 9/1983 | Tsuchida et al. | 417/295 |
| 4,553,906 A | * | 11/1985 | Boller et al. | 417/295 |
| 4,642,033 A | * | 2/1987 | Boller | 417/295 |
| 4,898,599 A | | 2/1990 | Settlemyer | |
| 5,033,944 A | * | 7/1991 | Lassota | 418/1 |
| 5,053,126 A | * | 10/1991 | Krasnoff | 210/188 |
| 5,302,300 A | * | 4/1994 | Porri | 210/774 |
| 5,487,769 A | * | 1/1996 | Hutchinson et al. | 55/442 |
| 5,492,461 A | * | 2/1996 | Kitchener et al. | 418/85 |
| 5,797,980 A | * | 8/1998 | Fillet | 95/106 |
| 5,993,522 A | * | 11/1999 | Huang | 96/294 |
| 6,156,102 A | * | 12/2000 | Conrad et al. | 95/172 |
| 6,267,560 B1 | * | 7/2001 | Charron | 417/53 |
| 6,616,719 B1 | * | 9/2003 | Sun et al. | 55/315.2 |
| 2003/0037679 A1 | * | 2/2003 | Kitchener | 96/270 |
| 2003/0106431 A1 | * | 6/2003 | Kitchener | 95/210 |

FOREIGN PATENT DOCUMENTS

SU 1798546 A1 2/1993

OTHER PUBLICATIONS

Copy of International Search Report for PCT/AU01/00403, completed Jun. 4, 2001.

* cited by examiner

Primary Examiner—Duane S. Smith
(74) Attorney, Agent, or Firm—Alston & Bird LLP

(57) ABSTRACT

A rotary compressor system having a drive rotary compressor unit, a separator vessel (13) receiving compressed gas and entrained liquid from said compressor for collecting the liquid therein and for returning the liquid to a lower pressure zone of the compressor and a moisture absorber receiving compressed gas flow leaving a separation zone of the separator vessel and passing the compressed gas flow relative to a flow of said liquid such that moisture in the compressed gas flow is transferred to said liquid.

22 Claims, 5 Drawing Sheets

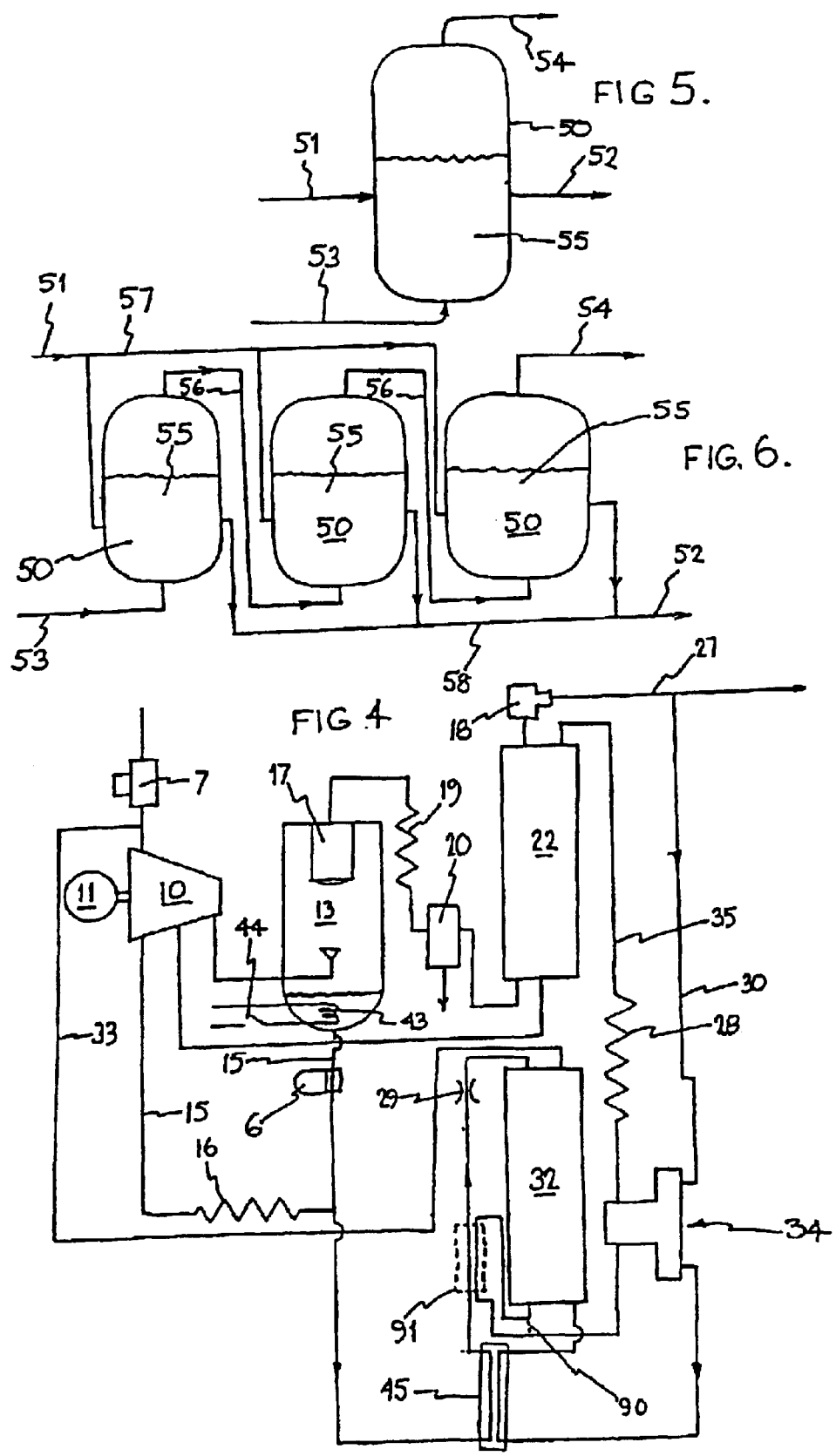

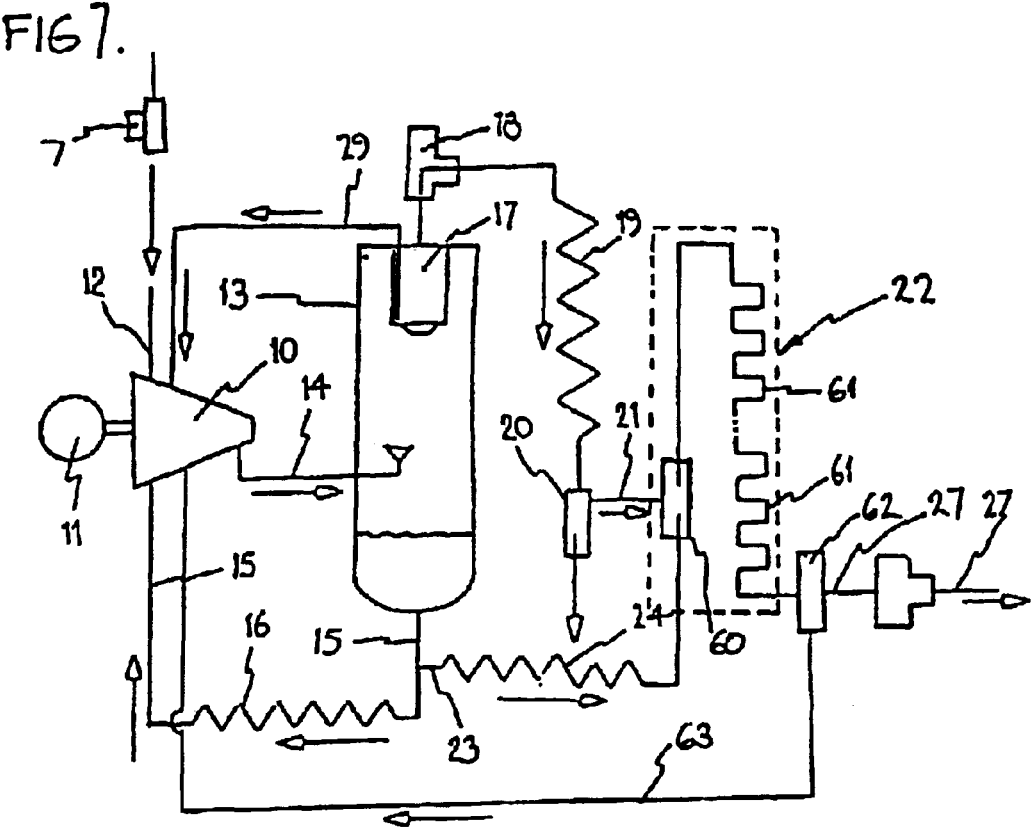
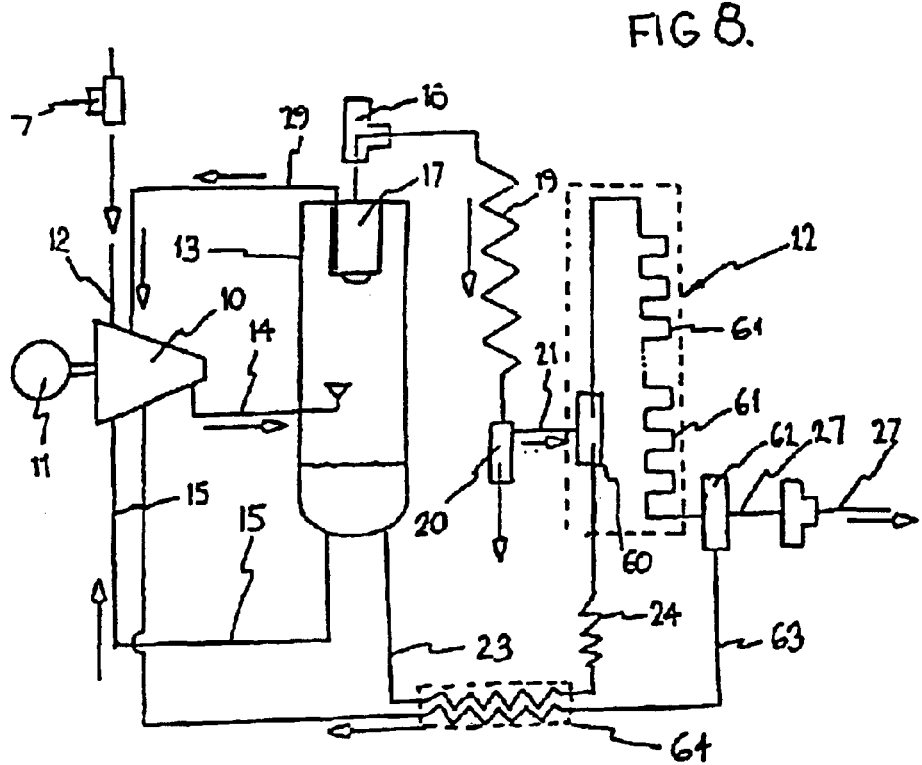

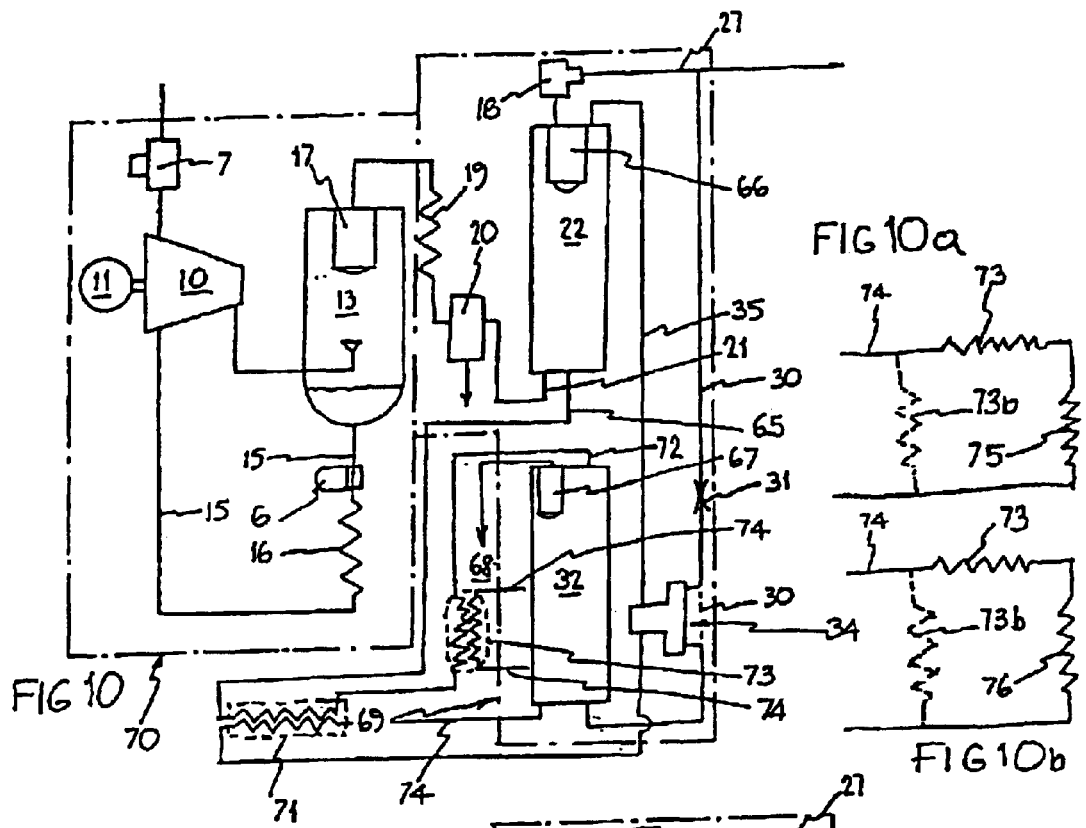
FIG 10
FIG 10a
FIG 10b
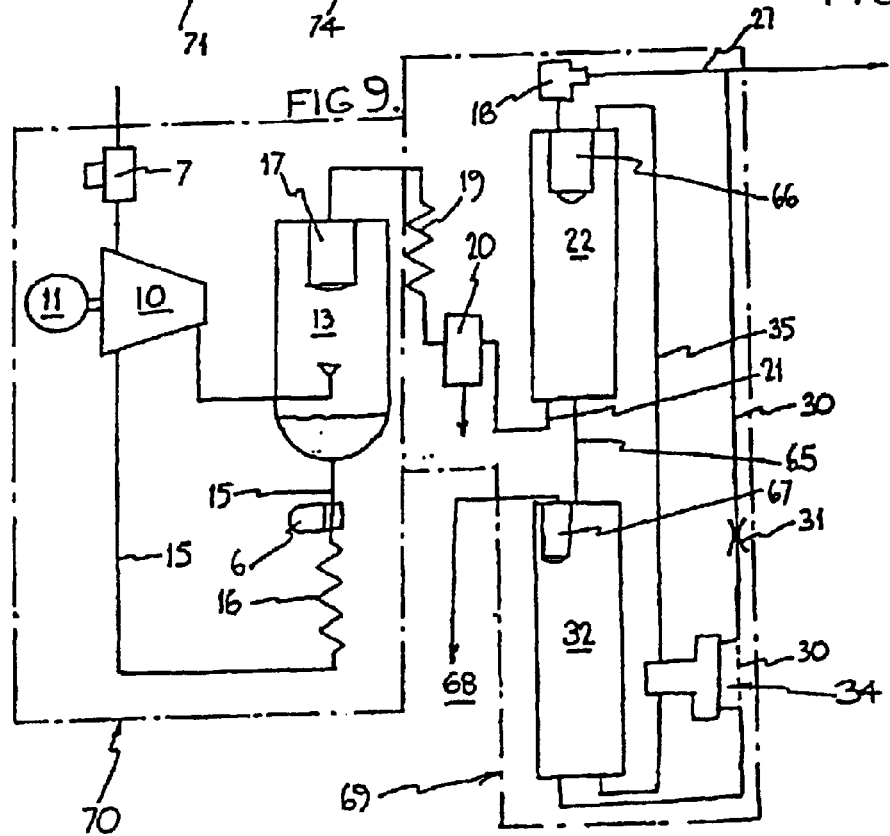
FIG 9.

INTEGRATED COMPRESSOR DRIER APPARATUS

BACKGROUND OF THE INVENTION

1) Field of the Invention

The present invention relates to improvements in rotary compressor systems particularly adapted to provide clean dry compressed gas at a discharge point therefrom.

2) Description of Related Art

There is increasingly a need to provide moisture free pressurized gas or air. Such moisture free pressurized gas or air is normally achieved by using various forms of gas or air drying equipment including refrigeration driers, however, such driers are expensive and complicated. The objective therefore is to provide in a simplified and inexpensive way, a rotary compressor system capable of providing clean dry compressed gas.

BRIEF SUMMARY OF THE INVENTION

Accordingly, the present invention provides a rotary compressor system utilising a liquid therein, said rotary compressor system including a driven rotary compressor unit adapted to receive gas to be compressed, a separator vessel arranged to receive compressed gas and entrained liquid from said compressor unit and for collecting said liquid therein, means for returning said liquid to a lower pressure zone of said compressor unit and to a moisture absorber, compressed gas flow leaving a separation zone of said separator vessel being passed to the moisture absorber to be contacted by a flow of said liquid whereby moisture in said compressed gas flow is transferred to said liquid.

According to a further aspect, the present invention provides a rotary compressor system utilising a liquid therein, said rotary compressor system including a driven rotary compressor unit adapted to receive gas to be compressed, a separator vessel arranged to receive compressed gas and entrained liquid from said compressor unit and for collecting said liquid therein, means for returning said liquid to a lower pressure zone of said compressor unit and to a moisture absorber, compressed gas flow leaving a separation zone of said separator vessel being passed through a first cooler means to condense at least a proportion of moisture carried by said compressed gas to be collected and discharged from said compressed gas flow prior to said compressed gas flow being passed to the moisture absorber to be contacted by a flow of said liquid whereby said compressed gas flow is further dried with moisture in said compressed gas being transferred to said liquid.

The liquid referred to in the aforesaid paragraphs is often a lubricant but does not necessarily need to be.

BRIEF DESCRIPTION OF THE SEVERAL VIEWS OF THE DRAWINGS

Further preferred features and aspects of this invention may be found in the annexed patent claims which are hereby made part of this specification and from the following description given in relation to the accompanying drawings, in which:

FIGS. 1, 2, 4, 7, 8, 9 and 10 are schematic illustrations of preferred embodiments of compressor systems including gas drier equipment according to the present invention;

FIGS. 3, 5, 6, 10*a*, 10*b* and 11 show schematically potential alternatives or changes to the compressor systems shown in the other drawings.

DETAILED DESCRIPTION OF THE INVENTION

Figure 1:
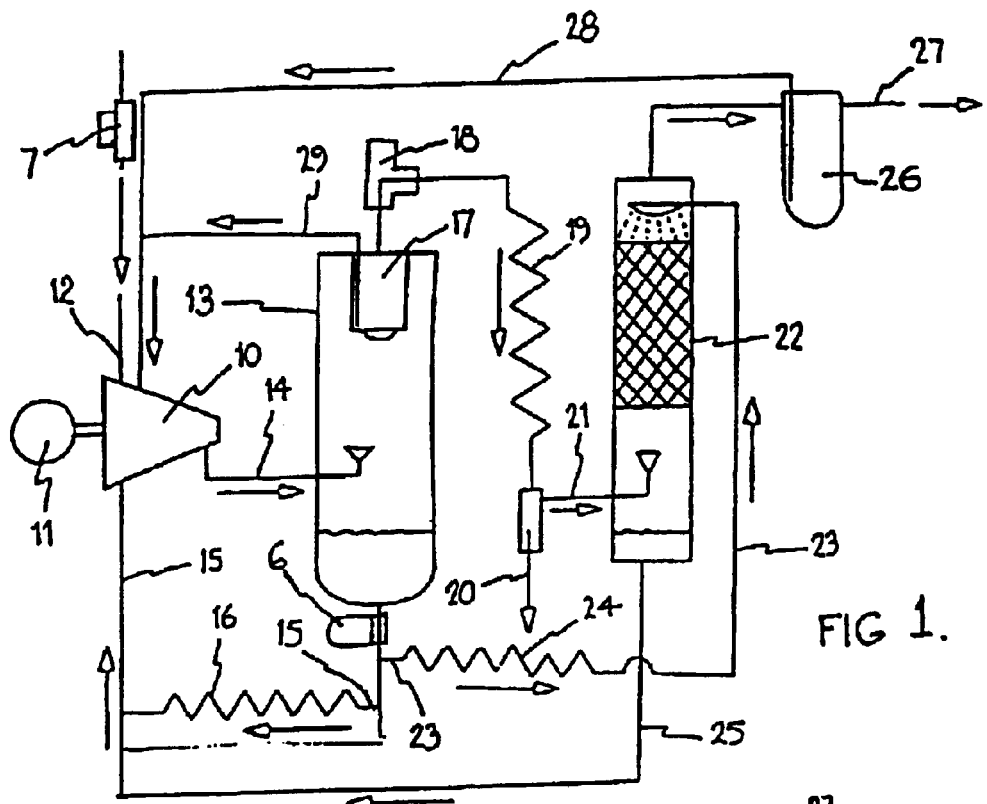

As illustrated in FIG. 1, a compressor system according to this preferred embodiment of the present invention may include a compressor unit 10 driven by a motor 11 which receives a gas (typically air) to be compressed at 12 via an inlet valve 7. The rotary compressor unit 10 may be a screw compressor of any known configuration or in fact any other form of rotary compressor. The system further includes a separator vessel 13 receiving compressed gas and entrained liquid via line 14 with a preliminary separation of gas and liquid occurring therein. The liquid is collected in a lower region of the vessel 13 and returned via line 15, a liquid or lubricant filter 6, and a liquid cooler 16, to a lower pressure region of the compressor unit 10. Compressed gas leaves the vessel 13 via a preliminary filter means 17 and a minimum pressure valve 18. The compressor system thus described is essentially conventional in nature and within the context of this invention might be substituted by any other known similar rotary compressor system.

The compressed gas flow leaving the separator vessel 13 is conveniently cooled in a gas cooler device 19 such that at least a portion of the moisture is cooled, condensed, collected and drained away at 20 from the system. The cool humid compressed gas flow is then passed via line 21 to an absorption column 22 where a shower of cool dry liquid is falling. As the compressed gas flow passes upwardly through this shower, moisture is absorbed into the liquid flow conveniently originating via diverting a portion of the liquid flow in line 15 through a line 23 and thereafter passing same through a further liquid cooler 24 prior to delivering same to the absorption column 22. In an alternative arrangement the diverted flow might be after the cooler 16 with or without further cooling. In this embodiment, the liquid is preferably of the type which is hydrophilic in nature, that is it will absorb moisture to some degree. Glycol based liquids including lubricants are useful for this purpose and may include such liquid lubricants as Ingersoll Rand's ULTRA™ type coolant and Kuba-Summit's SUPRA™ type coolant.

The liquid falls to the bottom of the absorber column 22 where it is collected and conveniently passed via line 25 back to line 15 or some other lower pressure region of the compressor circuit including the compressor unit 10. This liquid flow then mixes with the main liquid flow where it is heated and the absorbed moisture flashes into vapour. This vapour is subsequently condensed in the gas after cooler device 19 and at least partially drained away at 20.

The cool dry compressed gas flow leaving the absorption column 22 passes through a final filter means 26 so that no droplets of coolant can escape with the clean dry compressed gas discharge at 27. The filter means 18 and 26 may typically be of the coalescent type. Conveniently liquid purge lines 28, 29 are operatively associated with each of the filter means 17 and 26 to return any collected liquid back to a lower pressure portion of the compressor system such as the compressor unit 10 itself. Further possible changes to the system may include integrating the absorption column 22 into the separator vessel 13 whereby a secondary vessel is not required. Alternatively, the absorption column 22 might be integrated into the air receiver tank (not shown).

Figure 2:
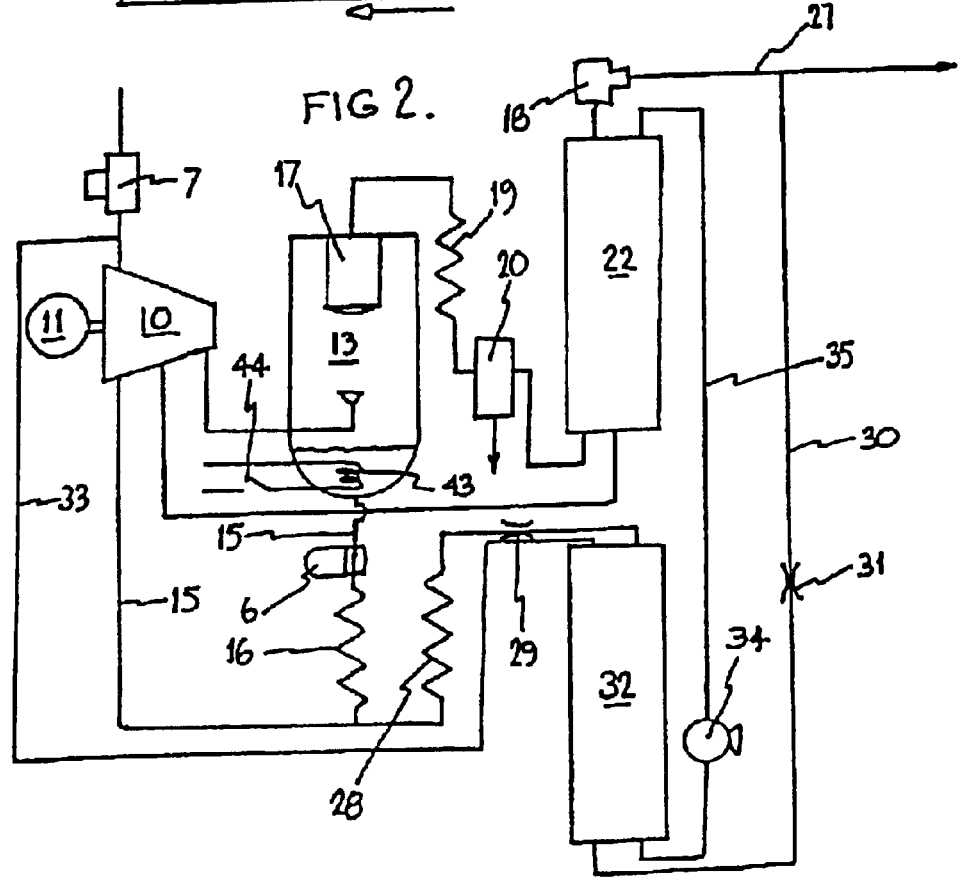

The integrated compressor drier described in the foregoing with reference to FIG. 1 attains a dewpoint of approximately 20–25° C. less than ambient. Consequently, when ambient temperature is 20° C., a dewpoint of approximately 0 to −5° C. might be expected. For some applications a dewpoint of −20 to −40° C. may be desired. This may be attained in a two stage process whereby dry liquid entering the absorber column passes first through a pre-separation process to lower its relative humidity. A possible arrangement for achieving this is shown in FIG. 2. In this arrangement, compressor 10 of the liquid injected positive displacement type (e.g. screw, vane or scroll) is driven by motor 11, which may be electric, hydraulic or internal combustion. Air or other gas enters through inlet valve 7 and a mixture of gas and liquid, after being compressed, passes to a separator vessel 13. Liquid is separated in the vessel 13 and is returned via a liquid filter 6, cooler 16 to the compressor 10. Some of the liquid is, however, further cooled in cooler 28 before passing through an orifice 29 whereby pressure falls to atmospheric. Whilst the liquid and the compressed gas are being separated in the separator vessel 13, the heat of compression evaporates most moisture contained in the liquid. This moisture in vapour form passes into an after cooler 19 where the compressed gas is cooled and most moisture condenses. A moisture separator 20 collects moisture droplets from the gas and purges them to waste. The compressed gas then is passed into the absorber column 22 where it contacts falling dry liquid. In passing upwards, the gas is dried and moisture is transferred to the falling liquid. Dry compressed gas leaves the absorber column through a minimum pressure valve (mpv) 18 and is discharged to a desired end use or to a receiver vessel not shown.

A small amount of dry air is removed from the discharge line 27 and is passed via line 30 via an orifice 31 to a stripper 32. This dry compressed gas is expanded through the orifice 31 to atmospheric pressure which further dries the gas. This ultra dry gas then passes upwardly through a failing shower of liquid in the stripper 32 and removes moisture and further dries the liquid passing through the stripper 32. The gas is then passed through line 33 back to the inlet of the compressor 10. Ultra dry liquid drops to the bottom of the stripper 32 where it is pumped by pump 34 via line 35 to the top of the absorber column 22. This ultra dry liquid falls through the absorber column removing moisture from the compressed gas, before returning via line 36 back to the compressor 10.

Figure 3:
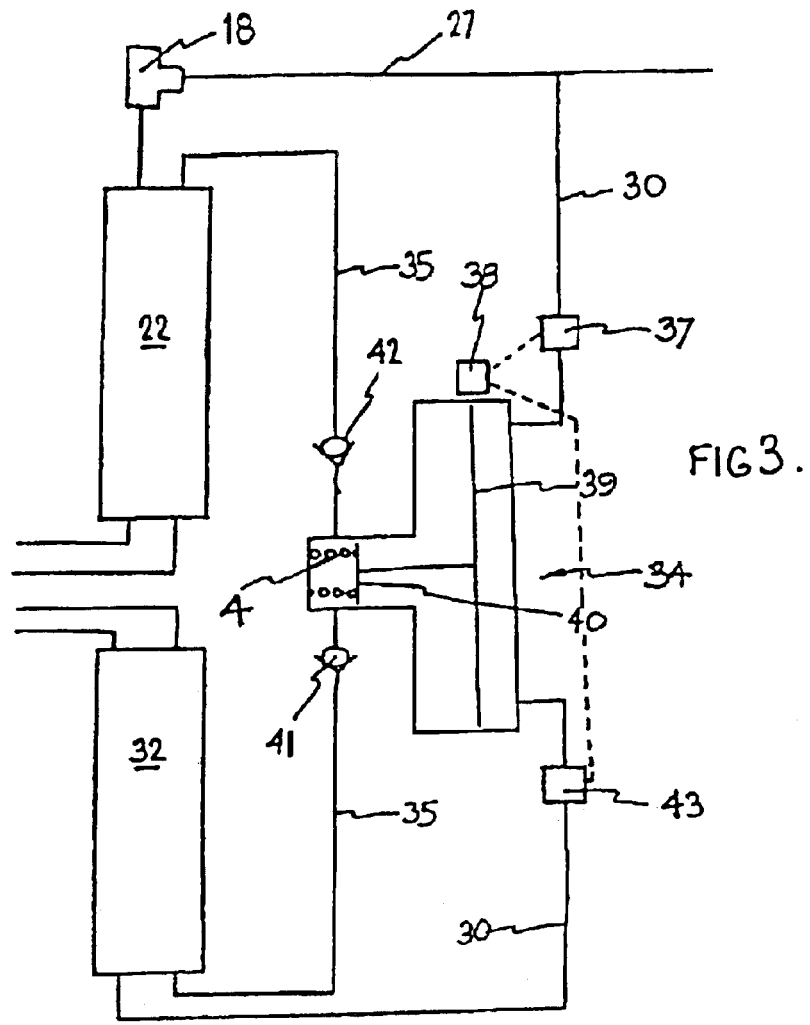

In a modification of the embodiment shown in FIG. 2, the pump 34 may be of the air driven type where compressed gas is used to power the pump as shown for example in FIG. 3. Conveniently, this compressed gas may be obtained from the dry air outlet divergent line 30. By this means the motive power of the pump is obtained from an energy source that may otherwise go to waste and no additional energy is needed. Such an arrangement may include an inlet valve 37 in the line 30 which is controlled by a position sensor 38 sensing the position of the larger piston 39. The valve 37 when activated admits high pressure gas on to the larger piston 39 drawing the smaller piston 40 to the left. Liquid enters the pump 34 via a non return valve 41 and exits via a non return valve 42. When the piston 40 has reached its extreme left position, sensor 38 stops, via valve 37, the gas supply from the line 30 opens the outlet valve 43. The spring 4 then pushes pistons 39, 40 back to a right hand or start position. There are many variations of this type of air driven pump and any other version might equally be used without departing from the scope of this invention. For larger machines, it may be preferable to use a rotary pump. In such an embodiment a vane motor may be installed in the line 30 to drive via a connecting shaft, a centrifugal pump installed in the line 35. The vane motor might be replaced by a turbine, screw or rotary piston type motor without departing from the spirit of this invention.

During intermittent operation of the compressor system, it is possible that the liquid temperature in the separator vessel 13 may not reach an optimum temperature before the compressor 10 shuts down. To eliminate this problem, an electrical heating element or coil 43 might be installed in the liquid pool in the base of the vessel 13. Power supply to the heating element 43 might optionally be controlled by a thermostatically operated switch 44 as shown in FIG. 2 sensing the liquid temperature.

In yet another preferred embodiment of the present invention as shown in FIG. 4, it is possible to attain even lower dewpoints by operating the stripping process at high temperature. This hot stripping dries the liquid passing to the absorber column still further and allows less bled air from the discharge line 27 via line 30 to be used as the stripping air is hotter and as such has a greater capacity to absorb moisture. Referring to FIG. 4, the liquid cooler 28 has been moved to the line 35 leading to the absorber column 22, i.e. after the liquid has passed through the stripper 32. Thus hot liquid enters the stripper 32 at the top. Dry gas via bleed line 30, expanded and further dried is first passed through a heat exchanger 45 warming the gas. This combination of hot liquid and hot gas allows the liquid to be dried more than via the cold stripping process shown in FIG. 2 and allows the use of less dry gas bled from the discharge line 27 via line 30. Whilst the heat exchanger 45 is shown in this embodiment, it is clear that the dry gas in line 30 could be heated by other means such as passing a loop of the pipe forming line 30 through the hot liquid pool in the separator vessel 13, or perhaps simply passing loops of the pipe forming line 30 around the outer shell of the separator vessel 13. FIG. 4 illustrates two possible embodiments. The first allows the liquid exiting the stripper 32 to flow via line 90, pump 34 and cooler 28 directly to the absorber 22. The second diverts this exiting liquid flow through a heat exchanger 91 being placed in heat exchange relationship with liquid flowing into the stripper 32.

The description of the embodiments set out above generally describe a counter flow contact arrangement for the liquid flow and the compressed gas flow in the absorber column 22. The nature of the stripper column 32 may be generally similar to that of the absorber column 22. However, counter flow arrangements are not essential to the performance of this invention. Any generally known arrangements for contacting a liquid flow with a pressurized gas flow could be used although it may be apparent to those skilled in the art that some arrangements will work better than others. One potential alternative configuration is a simple cross-flow absorber as shown schematically in FIG. 5. FIG. 6 illustrates a multistage cross-flow absorber which might also be used. In FIG. 5 a pool of liquid 55 is maintained in vessel 50 with the liquid being introduced via line 51 and withdrawn via line 52. Compressed air is supplied via line 53 to be bubbled through the liquid before leaving via line 54. In FIG. 6 a plurality of vessels 50 might be provided such that compressed gas is successively bubbled through the fluid in each vessel via intermediary connecting lines 56 with the liquid supplied via a header pipe 57 to all vessels and withdrawn via a common pipe 58.

For smaller machines where a relatively high moisture content is acceptable, parallel flow absorber constructions are acceptable. One such possible arrangement is shown in FIG. 7. In this embodiment, air from the moisture trap 20 enters one leg of a T-piece 60 with dry cool liquid entering the other leg. Liquid travels along the wall of a hose/pipe 61 forming an absorber 22. The hose or pipe 61 may be straight, serpentine or coiled and it has sufficient length to promote good mixing of the liquid and compressed gas and to ensure the moisture in the gas is absorbed into the liquid. At the end of the hose/pipe 61, a liquid separator 62 is provided essentially similar to the moisture trap 20, but which removes liquid droplets (together with any contained moisture) from the compressed gas. This liquid/moisture is returned to the compressor 10 or any lower pressure part of the compression circuit via line 63. If desired a filter means such as a coalescent type filter may be incorporated into the liquid separator 62 or in the discharge line 27 therefrom. Dry compressed gas without liquid then may be discharged via a minimum pressure valve 18 and line 27.

The difficulty with all cross-flow and parallel flow absorber systems is that the driest oil does not necessarily contact the driest compressed gas. In a counter flow absorber system, compressed gas with a degree of moisture content enters at the bottom and as the gas rises, the gas successively contacts drier and drier liquid whereby at the discharge point, the gas is contacting the most dry or totally dry liquid. In a parallel flow absorber, the most dry liquid contacts the gas with the greatest moisture content at the start of the drying process and at the end of the process, the gas is contacting liquid with the greatest moisture content. This effect may be reduced by increasing the liquid flow rate relative to the gas flow rate. By pushing more liquid through the absorber, the increase in the liquid moisture content on a percentage basis is reduced, but unfortunately there is an upper limit to how much liquid can be injected into the absorber. As the liquid must be cooled, if too much liquid is injected, good absorption and low RH use is achieved but the discharge temperature of the compression 10 falls (as more heat is' lost through the cooler). A lower discharge temperature means that less moisture is removed in the separator 13, and so, in this condition, the moisture content of the liquid entering the absorber is too high. This problem may be overcome or at least minimized by the addition of a small extra heat exchanger or recuperator 64 as shown in FIG. 8.

As shown in FIG. 8, liquid leaving the separator 13 is passed into a counter flow recuperator (heat exchanger) 64 if the tube in tube or plate type as known to those skilled in the art of heat exchange. The hot dry liquid is cooled by moist liquid returning from the droplet separator 60 via line 63. In turn the moist liquid is warmed by the cooling of the dry liquid. By this means heat is conserved and the compressor does not run too cool. Accordingly the mass flow rate of liquid may be increased, so the discharge RH of the liquid may be kept low.

In all embodiments described thus far, the liquid is returned to the screw at a convenient point in the casing of compressor 10. By this means no gas is wasted and the specific energy consumption is good. It is also possible to return the liquid to the inlet of the compressor, maintaining a liquid seal in the absorber by a float valve. A pump may also be used to pump liquid directly from the absorber to the separator. This pump can be of conventional design or an ejector.

A still further possible embodiment of a compressor system according to this invention is illustrated in FIG. 9. In this arrangement, moist gas enters into the bottom of the absorber 22 at 21. The gas then flows upwardly contacting falling dry liquid injected via line 35. Moisture is absorbed by the liquid from the gas, thereby drying the gas. Wet liquid is transferred via line 65 under action of the compressed gas to the stripper 32 where it enters at the top. The stripper 32 conveniently operates at a lower pressure than the absorber 22 and wet liquid flows downwardly within the stripper 32. Dry compressed gas leaves the absorber 22 via a minimum pressure valve 18 and line 27 after conveniently passing through a filter 66 to remove any droplets of liquid therefrom. Part of the dry compressed gas is bled from the discharge 27 via line 30 into the stripper 32. This dry gas rises through the stripper 32, drying the liquid removing moisture before exiting via filter 67 and is discharged to atmosphere at 68. Dry liquid is collected at the bottom of the stripper 32 and pumped via pump 34 to the top of the absorber 22 via line 35. The pump 34 may be any conventional pumping means as discussed on earlier embodiments including a gas driven pump of the type described with reference to FIG. 3. In this latter arrangement the gas driven pump may replace orifice 31 as illustrated. A drier 69 of the configuration shown in FIG. 9, in combination with a typical rotary compressor configuration 70 of any known arrangement including that illustrated, will use about 15% of the gas passing through it to regenerate the liquid used as an absorber material. Due to the energy cost of compressing gas, this loss may be considered somewhat wasteful.

Energy usage efficiencies may be improved by utilizing a configuration as shown in FIG. 10. Referring to FIG. 10, wet liquid leaving the absorber 22 via line 65 passes through a counter flow heat exchanger 71 and through a heater 73 before being injected into the top of the stripper 32 via line 72. By this means moisture is driven off into dry gas rising through the stripper 32. Dry liquid acting as an absorber leaving the stripper 32 via line 74 passes through the counter flow heat exchanger 71 and is cooled, which in turn provides the energy to preheat the liquid absorbent flowing to the stripper. Liquid then flows to pump 34 and is injected into the absorber 22 via line 35.

Heat supplied to the heater 73 may be by electric means or may utilize heat from a compressor by passing hot compressed gas or liquid through the heater 73 acting as a heat exchanger. As shown in FIG. 10a, hot compressed gas via line 74 passes through the heat exchanger 73 before entering an after cooler 75. Alternatively hot liquid via line 74 passes firstly through the heat exchanger 73 before passing through a liquid cooler 76 as shown in FIG. 10b. Whilst the drawings FIGS. 10a and 10b show series flow, it is also possible that the cooler 73 could be placed in a parallel flow circuit 73b. Conveniently, the liquid flow circuit of a standard compressor system 70 may be tapped at the liquid filter as shown, for example, in FIG. 11.

Figure 11:
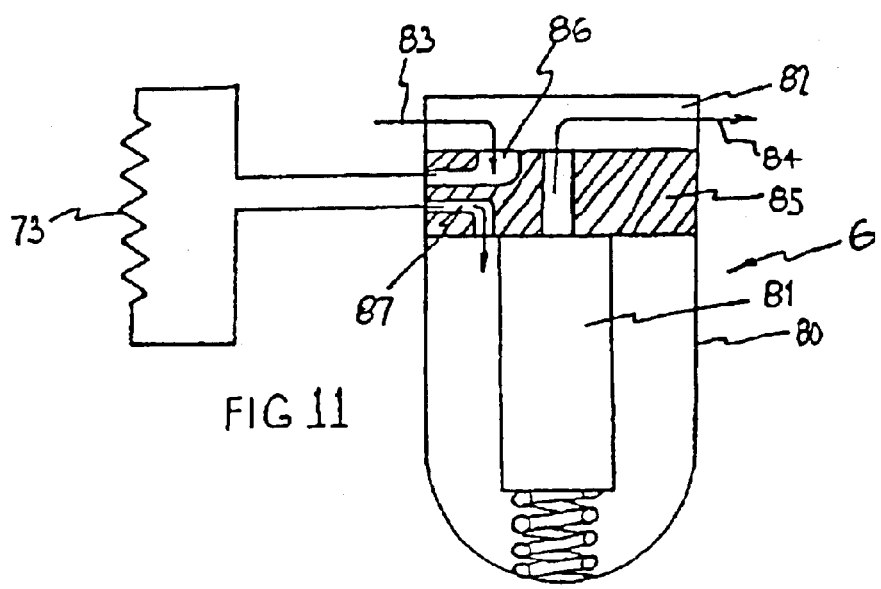

Most compressors of this general type are filled with a spin-on liquid filter 6 which has an outer can 80 and an inner paper (or similar) filter element 81. Liquid to be filtered enters the head 82 at 83 and passes directly into the can 80. It then passes through the filter element 81 before leaving at 84. FIG. 11 illustrates the use of a novel adapter plate 85 interposed between the head 82 and can 80. Liquid may thereby be diverted via part 86 through the heat exchanger 73 located in the drier 69 before returning through part 87. A drier of this heated configuration is believed to use less than 1% of the pressurized gas flow to regenerate the liquid used as the moisture absorbent.

It will of course be appreciated that the compressor systems as described in the foregoing may be built as an integral construction including the compressor 70 and the drier 69 on a common support base, structure a platform or alternatively they could be built respectively on different support platforms or structures.

What is claimed is:

1. A rotary compressor system including a liquid therein, said rotary compressor system including a driven rotary compressor unit adapted to receive gas to be compressed, a separator vessel arranged to receive compressed gas and entrained liquid from said compressor unit and for collecting said liquid therein, a liquid return arrangement for returning said liquid to a lower pressure zone of said compressor unit and to a moisture absorber, compressed gas flow leaving a separation zone of said separator vessel being passed to the moisture absorber to be contacted by a flow of said liquid whereby moisture in said compressed gas flow is transferred to said liquid.

2. A rotary compressor system including a liquid therein, said rotary compressor system including a driven rotary compressor unit adapted to receive gas to be compressed, a separator vessel arranged to receive compressed gas and entrained liquid from said compressor unit and for collecting said liquid therein, a liquid return arrangement for returning said liquid to a lower pressure zone of said compressor unit and to a moisture absorber, compressed gas flow leaving a separation zone of said separator vessel being passed through a first cooler arrangement to condense at least a portion of moisture carried by said compressed gas to be collected and discharged from said compressed gas flow prior to said compressed gas flow being passed to the moisture absorber to be contacted by a flow of said liquid whereby said compressed gas flow is further dried with moisture in said compressed gas being transferred to said liquid.

3. A rotary compressor system according to claim 1 or claim 2, further including a stripper arrangement provided to receive a flow of said liquid and to pass said liquid in contact with a portion of dry compressed gas flow within or exiting from said rotary compressor system to remove moisture from said liquid prior to introducing said liquid into an absorber.

4. A rotary compressor system according to claim 1 or claim 2, wherein the liquid entering said moisture absorber is passed through a cooler arrangement to cool said liquid prior to delivery to said moisture absorber.

5. A rotary compressor system according to claim 2 wherein a portion of the liquid leaving said separator vessel is passed through a second cooler arrangement prior to being caused to flow in contact with said compressed gas flow.

6. A rotary compressor system according to claim 5, wherein said liquid is introduced into an absorption column and passed in a counter flow manner along said column with the compressed gas flow passing in an opposite direction.

7. A rotary compressor system according to claim 6, wherein the liquid flow from said separator vessel returning to the compressor unit passes through a third cooler arrangement.

8. A rotary compressor system according to claim 6, wherein a liquid return arrangement is provided to return the liquid from the absorption column to a lower pressure zone of the compressor system.

9. A rotary compressor system according to claim 1, wherein the compressed gas leaving the separation zone of said separator vessel is passed through a preliminary filter adapted to remove said entrained liquid therefrom.

10. A rotary compressor system according to claim 9, wherein a purge line is provided from said preliminary filter for returning collected liquid to a lower pressure region of said compressor unit.

11. A rotary compressor system according to claim 1 or claim 2 wherein the compressed gas flow exiting said system is passed through a filter within said system to remove any liquid from said compressed gas flow.

12. A rotary compressor system according to claim 11 wherein the filter is a coalescent filter.

13. A rotary compressor system according to claim 11, wherein the filter is mounted within the moisture absorber.

14. A rotary compressor system according to claim 1, wherein the liquid is hydrophilic.

15. A rotary compressor system according to claim 1, wherein the liquid is not hydrophilic.

16. A rotary compressor system according to claim 1, wherein the driven rotary compressor unit and the separator vessel are mounted on a first support structure and the absorber is mounted on a second support structure separate from said first support structure.

17. A rotary compressor system according to claim 1, wherein the driven rotary compressor unit, the separator vessel and the absorber are mounted on a common support structure.

18. A rotary compressor system according to claim 16 wherein the absorber is mounted within the separator vessel.

19. A rotary compressor system according to claim 16, wherein the absorber is mounted within a compressed gas receiver vessel.

20. A rotary compressor system according to claim 1, wherein the liquid passing through the driven compressor unit also passes through the absorber.

21. A rotary compressor system according to claim 14, wherein the liquid is a lubricant.

22. A rotary compressor system according to claim 14, wherein the liquid is a coolant.

* * * * *